(12) United States Patent
Monger

(10) Patent No.: US 11,860,876 B1
(45) Date of Patent: Jan. 2, 2024

(54) SYSTEMS AND METHODS FOR INTEGRATING DATASETS

(71) Applicant: Change Healthcare Holdings, LLC, Nashville, TN (US)

(72) Inventor: Andrew Monger, Franklin, TN (US)

(73) Assignee: Change Healthcare Holdings, LLC, Nashville, TN (US)

( * ) Notice: Subject to any disclaimer, the term of this patent is extended or adjusted under 35 U.S.C. 154(b) by 0 days.

(21) Appl. No.: 17/308,175

(22) Filed: May 5, 2021

(51) Int. Cl.
*G06F 16/2455* (2019.01)

(52) U.S. Cl.
CPC .............. *G06F 16/24564* (2019.01)

(58) Field of Classification Search
CPC ................................. G06F 16/24564
See application file for complete search history.

(56) References Cited

U.S. PATENT DOCUMENTS

| | | | | |
|---|---|---|---|---|
| 7,155,427 | B1 * | 12/2006 | Prothia | G06F 16/284 707/999.005 |
| 11,216,701 | B1 * | 1/2022 | Sim | G06F 18/2163 |
| 2003/0046280 | A1 * | 3/2003 | Rotter | G16H 10/60 |
| 2003/0158850 | A1 * | 8/2003 | Lawrence | G06F 16/313 707/E17.084 |
| 2004/0260694 | A1 * | 12/2004 | Chaudhuri | G06F 16/2468 707/999.005 |
| 2005/0027717 | A1 * | 2/2005 | Koudas | G06F 16/215 |
| 2006/0085483 | A1 * | 4/2006 | Mooney | G06F 16/273 |
| 2012/0016837 | A1 * | 1/2012 | Matsuda | G06F 16/2456 707/E17.005 |
| 2012/0059786 | A1 * | 3/2012 | Kammergruber | G06N 5/02 706/50 |
| 2012/0310874 | A1 * | 12/2012 | Dantressangle | G06F 16/221 707/600 |
| 2014/0082021 | A1 * | 3/2014 | Hendrey | G06F 16/90344 707/772 |
| 2014/0229473 | A1 * | 8/2014 | Mehrotra | G06F 16/3347 707/780 |
| 2017/0364563 | A1 * | 12/2017 | Gao | G06F 16/288 |
| 2018/0068023 | A1 * | 3/2018 | Douze | G06F 16/9535 |
| 2018/0096019 | A1 * | 4/2018 | Edwards | G06F 16/27 |
| 2018/0226148 | A1 * | 8/2018 | Lozano | G16H 80/00 |
| 2018/0277242 | A1 * | 9/2018 | Zhong | A61B 5/486 |
| 2021/0158090 | A1 * | 5/2021 | Santra | G06N 3/044 |

OTHER PUBLICATIONS

Introduction to Queries (Year: 2020).*

(Continued)

*Primary Examiner* — Mark D Featherstone
*Assistant Examiner* — Kweku William Halm
(74) *Attorney, Agent, or Firm* — Meunier Carlin & Curfman LLC

(57) ABSTRACT

In order to improve the integrating of datasets, improved systems and methods for matching records from a first dataset and a second dataset are provided. Records from the first dataset and the second dataset that are associated with the same individuals are identified. The records are identified using a combination of Euclidean distance, Leviathan distance, and the application of one or more rules. Once the records that are associated with the same individuals are identified, the records can be combined in an integrated dataset.

20 Claims, 7 Drawing Sheets

(56) References Cited

OTHER PUBLICATIONS

Lavoie et al., "An accurate estimation of the Levenshtein distance using metric trees and Manhattan distance", IWSC '12: Proceedings of the 6th International Workshop on Software Clones Jun. 2012, pp. 1-7 (Year: 2012).*
Is Soundex Good Enough for You? On the Hidden Risks of Soundex-Based Name Searching. Frankie Patman and Leonard Shaefer © 2001-2003 Language Analysis Systems, Inc. 20 pages.
Hervé Jégou, Matthijs Douze, Cordelia Schmid. Product Quantization for Nearest Neighbor Search. IEEE Transactions on Pattern Analysis and Machine Intelligence, Institute of Electrical and Electronics Engineers, 2011, 33 (1), pp. 117-128. ff10.1109/TPAMI.2010.57ff. ffinria-00514462v2f.
Douze M., Jégou H., Perronnin F. (2016) Polysemous Codes. In: Leibe B., Matas J., Sebe N., Welling M. (eds) Computer Vision—ECCV 2016. ECCV 2016. Lecture Notes in Computer Science, vol. 9906. Springer, Cham. https://doi.org/10.1007/978-3-319-46475-6_48.

* cited by examiner

TF-IDF for each token $$\begin{bmatrix} 1.1 & 0 & 0 & 0 & 0 & 0 & 0.5 \\ 0 & 1.9 & 0 & 0 & 0 & 0 & 0.5 \\ 0 & 0 & 2.6 & 0 & 0 & 0 & 0.5 \\ 0 & 0 & 7.8 & 0.6 & 0 & 0 & 0 \\ 0 & 0 & 0 & 1.5 & 2.7 & 0 & 0 \\ 1.6 & 0 & 0 & 0 & 0.4 & 0 & 0 \\ 0 & 0 & 0 & 0 & 0 & 0.9 & 1.7 \end{bmatrix}$$

Patient #1 — 137A
Patient #2 — 137B
Patient #3 — 137C

*FIG. 2*

| Rule | First Name | Last Name | Birthdate | Gender | Address | Euclidean Distance |
|---|---|---|---|---|---|---|
| Rule 155A | 2 | 2 | FREE | 0 | 6 | <=1.4 |
| Rule 155B | 2 | 2 | FREE | FREE | 6 | <=1.4 |
| Rule 155C | 2 | FREE | 2 | 0 | 6 | <=1.4 |
| Rule 155D | 2 | FREE | 2 | FREE | 6 | <=1.4 |

*FIG. 3*

SYSTEMS AND METHODS FOR INTEGRATING DATASETS

BACKGROUND

Healthcare claim systems are fragmented across different insurance payers processing claims and different providers offering services. Even within a healthcare context, this fragmentation creates variations in patient identification information. These variations in turn make data integration from one dataset to another problematic. Resolving this data integration problem at the individual patient or enrollee level is referred to in the industry as identity resolution.

While there is tremendous value in integrating healthcare data across various platforms, even more business intelligence is unlocked by integrating data from different datasets. These datasets can include, for example, consumer-patient behavior, patient and provider demographics, and clinical data that supplements the utilization and financial information inherent in claim submissions.

The ability to accurately integrate arbitrary datasets, each with its own idiosyncrasies, enables new dimensions to healthcare data science and other fields.

SUMMARY

In order to improve the integrating of datasets, improved systems and methods for matching records from a first dataset and a second dataset are provided. According to embodiments of the system and method provided, first and second datasets are received that each include multiple records. The first dataset may include records associated with individuals, such as claims submitted by individuals, and the second dataset may also include records associated with individuals. At least one of the individuals in the first and second datasets may be the same individual(s). In order to determine which records from the first and second datasets are likely associated with the same individuals, according to embodiments of the method described herein, the records of each dataset are processed to extract tokens corresponding to each word in each attribute of each record. A list of the extracted tokens is created, and a weight is associated with each token based on the list. The weight assigned to the token is inversely related to the number of times that the token appears in the list. The token weights are used to create a vector for each record that includes a count for each token multiplied by its associated weight. A record from the first dataset is selected as a query, and a Euclidian distance between the vector of the query and the vector of each record in the second dataset is computed. The records from the second dataset with the smallest computed distances are selected. As an additional step, a Levenshtein distance is computed between the attributes of the query and the attributes of the selected records, and the records having the smallest Levenshtein distances are further selected. An additional step of applying attribute-specific rules to each of the selected records may be used to even further narrow the set of selected records. The set of selected records is returned as the records from the second dataset that are likely associated with the same individual as the query record from the first dataset. The method may continue by considering each record of the first dataset of the query.

In an embodiment, a method is provided. The method includes: receiving a first dataset by a computing device, wherein the first dataset comprises a first plurality of records and each record of the first plurality of records comprises one or more attributes; receiving a second dataset by the computing device, wherein the second dataset comprises a second plurality of records and each record of the second plurality of records comprises one or more attributes; receiving a query by the computing device, wherein the query comprises a record from the first plurality of records; for each record of the second plurality of records, calculating a first distance between the record of the second plurality of records and the query by the computing device; selecting a first subset of records from the second plurality of records based on the calculated first distance for each record of the second plurality of records by the computing device; for each record in the first subset of records, calculating a second distance based on the one or more attributes of the query and the one or more attributes of the record by the computing device; selecting a second subset of records from the first subset of records based on the calculated second distance for each record of the first subset of records by the computing device; and providing the records in the second subset of records in response to the query.

Embodiments may include some or all of the following features. The method may further include: generating a list of tokens based on the one or more attributes of the first plurality of records and the one or more attributes of the second plurality of records; generating a token weight for each token in the list of tokens; and for each record in the first and the second plurality of records, generating a vector, wherein the vector for a record comprises a count of each token of the list of tokens that appears in the record multiplied by the token weight for the token. Calculating the first distance between the record of the second plurality of records and the query may include calculating the first distance between the record of the second plurality of records and the query based on the vector corresponding the query and vector corresponding to the record by the computing device. The token weight for a token may be based on the inverse of a frequency of the tokens in the list of tokens. The first distance may be a Euclidean distance. The second distance may be a Levenshtein distance. The method may further include: receiving a plurality of rules; applying the rules to the records in the second subset of records to generate a third subset of records, wherein each record in the third subset of records matches at least one rule of the plurality of rules; and providing the records in the third subset of records in response to the query. The method may further include removing non-alphanumeric characters from the one or more attributes of the first plurality of records and the second plurality of records. The query may be associated with an individual, and the method may further include determining that the records in the second subset of records are also associated with the individual. The first dataset may be SDoH data and the second dataset may be healthcare claim data.

In an embodiment, a system is provided. The system includes: at least one computing device; and a memory storing computer-executable instructions. The computer-executable instructions when executed by the at least one computing device cause the at least one computing device to: receive a first dataset, wherein the first dataset comprises a first plurality of records and each record of the first plurality of records comprises one or more attributes; receive a second dataset, wherein the second dataset comprises a second plurality of records and each record of the second plurality of records comprises one or more attributes; receive a query, wherein the query comprises a record from the first plurality of records; for each record of the second plurality of records, calculate a first distance between the record of the second plurality of records and the query;

select a first subset of records from the second plurality of records based on the calculated first distance for each record of the second plurality of records; for each record in the first subset of records, calculate a second distance based on the one or more attributes of the query and the one or more attributes of the record; select a second subset of records from the first subset of records based on the calculated second distance for each record of the first subset of records; and provide the records in the second subset of records in response to the query.

Embodiments may include some or all of the following features. The system may further include computer-executable instructions that when executed by the at least one computing device cause the at least one computing device to: generate a list of tokens based on the one or more attributes of the first plurality of records and the one or more attributes of the second plurality of records; generate a token weight for each token in the list of tokens; and for each record in the first and the second plurality of records, generate a vector, wherein the vector for a record comprises a count of each token of the list of tokens that appears in the record multiplied by the token weight for the token. Calculating the first distance between the record of the second plurality of records and the query may include calculating the first distance between the record of the second plurality of records and the query based on the vector corresponding the query and vector corresponding to the record. The token weight for a token may be based on the inverse of a frequency of the tokens in the list of tokens. The first distance may be a Euclidean distance and the second distance may be a Levenshtein distance. The system may further include computer-executable instructions that when executed by the at least one computing device cause the at least one computing device to: receive a plurality of rules; apply the rules to the records in the second subset of records to generate a third subset of records, wherein each record in the third subset of records matches at least one rule of the plurality of rules; and provide the records in the third subset of records in response to the query. The system may further include computer-executable instructions that when executed by the at least one computing device cause the at least one computing device to remove non-alphanumeric characters from the one or more attributes of the first plurality of records and the second plurality of records.

In an embodiment, a computer-readable medium is provided. The computer-readable medium storing computer-executable instructions that when executed by at least one computing device cause the at least one computing device to: receive a first dataset, wherein the first dataset comprises a first plurality of records and each record of the first plurality of records comprises one or more attributes; receive a second dataset, wherein the second dataset comprises a second plurality of records and each record of the second plurality of records comprises one or more attributes; receive a query, wherein the query comprises a record from the first plurality of records; for each record of the second plurality of records, calculate a first distance between the record of the second plurality of records and the query; select a first subset of records from the second plurality of records based on the calculated first distance for each record of the second plurality of records; for each record in the first subset of records, calculate a second distance based on the one or more attributes of the query and the one or more attributes of the record; select a second subset of records from the first subset of records based on the calculated second distance for each record of the first subset of records; and provide the records in the second subset of records in response to the query.

The disclosed embodiments provide many advantages over the prior art. First, the disclosed embodiments, by considering both Euclidian distance and Levenshtein distance when determining records likely associated with the same individual, improves upon both the speed and accuracy of prior art methods for dataset integration. Because of the improved accuracy, the need for human review of integrated datasets is reduced, which greatly lowers the costs associated data integration. By improving both speed and accuracy, the functioning of any computing device that performs data integration using the disclosed embodiments is improved.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate a data integration system and method. Together with the description, the figures further serve to explain the principles of the data integration system and method described herein and thereby enable a person skilled in the pertinent art to make and use the data integration system and method.

FIG. 2 is an illustration of example vectors generated for several records of a dataset;

FIG. 3 is an illustration of a plurality of rules that may be used to match one or more records;

DETAILED DESCRIPTION

Figure 1:
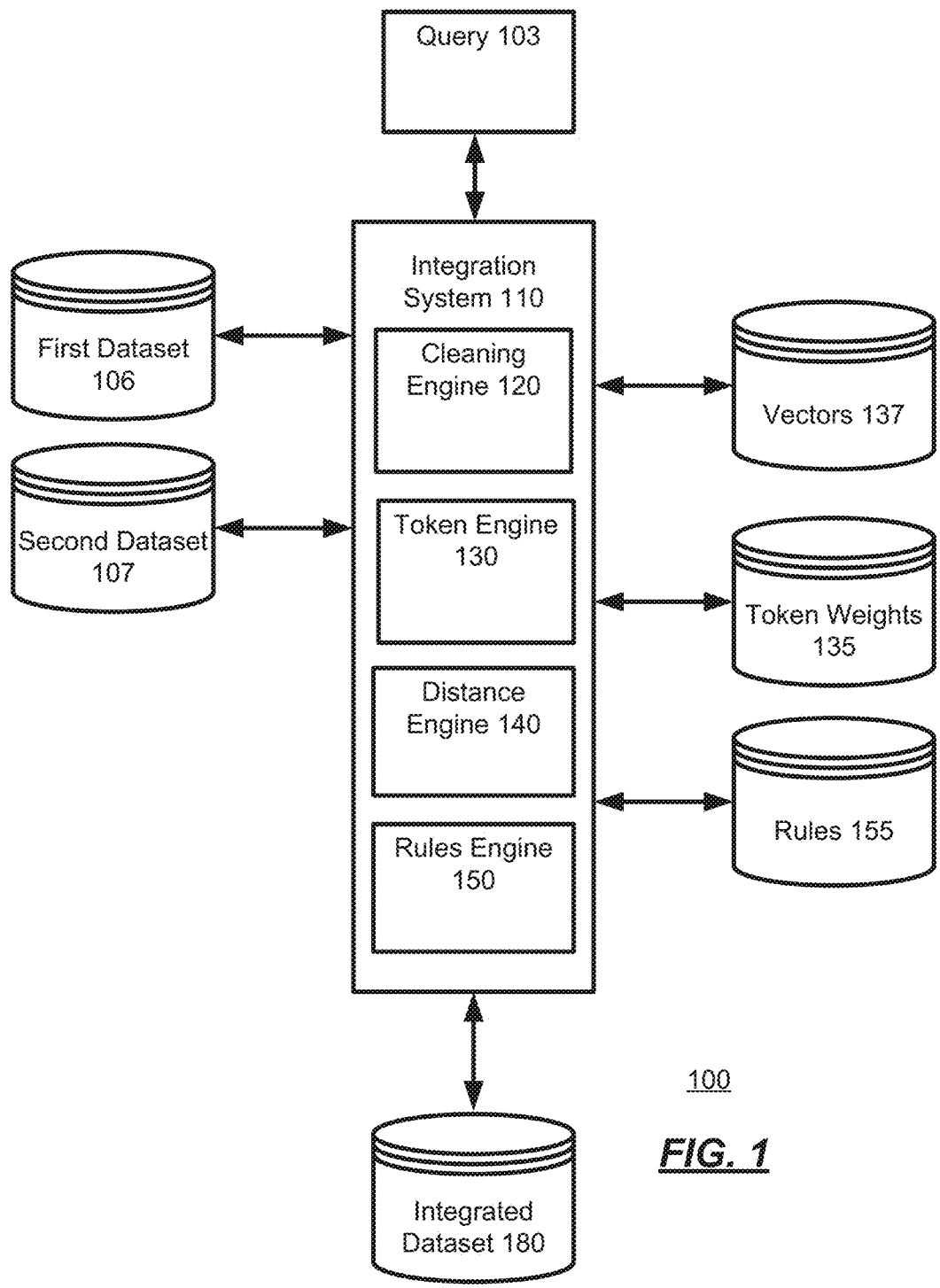
FIG. 1 is an example environment for identifying records in a first dataset and second dataset that likely refer to, or are associated with, the same individual or entity.

FIG. 1 is an example environment 100 for identifying records in a first dataset and second dataset that likely refer to, or are associated with, the same individual or entity. As may be appreciated, integrating or combining two or more datasets may be extremely useful for a variety of fields and industries. However, before two datasets can be integrated, the records from each dataset that correspond to the same individual or entity must first be identified.

Because of differences in how data is collected by different organizations, differences in how individuals report their information, distinct individuals with similar names, and movement of individuals, among other things, accurately determining which records are associated with the same individual may be difficult. For example, an individual named "Robert R Smith II" may be referred to "Rob Smith" in some datasets, "R. Smith" in other databases, and "Bobby Smith Jr." in another dataset. In addition, Robert may have lived in different places at different times and may have different addresses listed in different datasets depending on when they were generated. Robert may also have lived with his father of the same name, which further complicates the analysis. As can be seen, determining which records in two distinct datasets belong to the same individual can be a difficult and inaccurate process, which often requires input or oversite by human reviewers, which is expensive and time consuming.

Accordingly, to increase the accuracy of matching records to individuals, reduce the need for human reviewers, and increase the quality of combined datasets, the environment 100 includes the integration system 110. As shown, the integration system 110 includes several components including, but not limited to, a cleaning engine 120, a token engine 130, a distance engine 140, and a rules engine 150. More or fewer components may be supported by the integration system 110. Some or all of the components of the integration system 110 may be implemented together, or separately, by one or more computing devices, such as the computing system 700 illustrated with respect to FIG. 7.

At a high level, the integration system 110 may receive a first dataset 106 and a second dataset 107 and may combine the datasets to create an integrated dataset 180. Each of the first dataset 106 and the second dataset 106 may include a plurality of records, and each record may include a plurality of attributes. Generally, each record may be associated with an individual or entity, and the attributes associated with the record may each describe a particular feature or status of the individual. Example attributes include name, address, date of birth, height, marital status, vaccination status, claim number, etc. Other attributes may be supported. In some embodiments, the first dataset 106 may be a social determinants of health ("SDoH") dataset and the second dataset 107 may be a healthcare claims dataset.

The integration system 110 may generate the integrated dataset 180 by determining what records from the first dataset 106 and the second dataset 107 are associated with the same individual or entity. The records determined to be associated with the same individual may then be combined, or otherwise linked with each other, to create the integrated dataset 180. How the integration system 110 creates the integrated dataset 180 is described further below.

The cleaning engine 120 may clean the records of the first dataset 106 and the second dataset 107. In some embodiments, the cleaning engine 120 may clean the records by removing all non-alphanumeric characters from the attributes of the records. For example, the cleaning engine 120 may remove non-alphanumeric characters such as "#", "?", and "$".

In other embodiments, the cleaning engine 120 may further clean the records by replacing common abbreviations with their associated terms, fixing common or known misspellings, removing, or adding capitalization, etc. Any method for cleaning or standardizing datasets may be used.

The token engine 130 may generate tokens for each record of the first dataset 106 and the second dataset 107. Each token may correspond to a word in a record of a dataset. In some some embodiments, the token engine 130 may generate the tokens by, for each record, parsing the words found in the attributes associated with the record into one or more tokens. Depending on the embodiment, each record may have more associated tokens than attributes.

The token engine 130 may use term frequency-inverse document frequency ("TF-IDF") to generate token weights 135 that indicate how unique each token is with respect to the other tokens found in the first dataset 106 and the second dataset 107. In particular, the token engine 130 may generate the weights 135 by first generating a non-deduplicated list of all of the tokens that were found in the records of the first dataset 106 and the second dataset 107. Because the list is non-deduplicated, if a token such as "Andrew" appears 500 times in the first dataset 106 and the second dataset 107 it will appear 500 times in the list of tokens.

The token engine 130 may use the generated list of tokens to generate the token weights 135 for each token. In some embodiments, a token weight 135 may be generated for each token such that the token weight 135 for a token is inversely proportional to the frequency of the token in the list of tokens. Put another way, the token that appears in the list of tokens the most may be assigned the lowest token weight, and the token that appears in the list of tokens the least may receive the highest token weight.

After generating the token weights 135, the token engine 130 may generate a vector 137 for each record of both the first dataset 106 and the second dataset 107 that includes an entry for each token. The entry for each token may include a count of the number of times that the token appears in an attribute of the record multiplied by the token weight 135 generated for that token. As may be appreciated, many of the entries in a vector 137 for each token are likely to be zero, since very few tokens are likely to appear in each record.

FIG. 2 is an illustration of example vectors 137 generated for several records of a dataset. In the example shown, a set of vectors includes a vector 137A associated with the record corresponding to "Patient #1"; a vector 137B associated with the record corresponding to "Patient #2"; and a vector 137C associated with the record corresponding to "Patient #3." Each column in each vector 137 is associated with a unique token and includes the count for that token in the record multiplied by the token weight 135 determined for that token by the token engine 130. As an example, each of the vectors 137A, 137B, and 137C does not include the token corresponding to the first, second, and sixth column. As another example, the vector 137A includes a value of 2.6 for the fifth column and the vector 137B includes a value of 7.8 for the fifth column. Given a token weight 135 of 1.3 for the token corresponding to the fifth column, the token appeared in the record corresponding to the vector 137A two times (i.e., 2×1.3) and in the record corresponding to the vector 137B six times (i.e., 6×1.3).

Returning to FIG. 1, after generating the token weights 135, and as part of generating the integrated dataset 180, the integration system 110, for each of the records of the first dataset 106, may select a record from the first dataset 106, and may determine records from the second dataset 107 that are likely associated with the same individual as the selected record. The selected record and the determined records may then be added or linked together as part of the integrated dataset 180. The integration system 110 may continue until some or all of the records of the first dataset 106 have been considered. The selected record from the first dataset 106 is referred to herein as the query 103.

After a query 103 is selected from the first dataset 106, the distance engine 140 may use the vectors 137 to calculate a distance between the vector 137 associated with the query 103 and the vector 137 associated with each record of the second dataset 107. Depending on the embodiment, the distance may be a Euclidean distance. In general, the smaller the calculated distance for a record and the query 103, the more similar the record and the query 103.

After calculating the distances, the distance engine 140 may select the records from the second dataset 107 with the smallest calculated distance. In some embodiments, the selected number may be fixed (e.g., select the top three, five, or ten records). The fixed number may be set by a user or administrator or may be based on the total number of records in the first dataset 106 and/or second dataset 107.

After the records have been selected based on the Euclidean distances, the distance engine 140 may further narrow the selection of records by computing the Levenshtein distance between each of the selected records and the record corresponding to the query 103. Unlike the Euclidean distance, the Levenshtein distance may be calculated based on the attributes of the records, rather than the generated vectors 137.

In particular, the Levenshtein distance between two records is based on the number of characters in each attribute of the first record that have to be changed to match the corresponding attributes in the second record. As may be appreciated, computing the Levenshtein distance between two records is much more computationally expensive than computing the Euclidean distance between vectors 137, thus, computing the Levenshtein distance only on the records that have been found to have a close Euclidian distance may save substantial computing resources.

In some embodiments, the distance engine 140 may compute the Levenshtein distance between two records across all of the attributes. In other words, the Levenshtein distance for two records may be the sum of the Levenshtein distances computed for each pair of attributes. Alternatively, the Levenshtein distance may be calculated between two records across only one or more select attributes. In particular, the Levenshtein distance between two records may only be calculated using what are referred to herein as identity attributes. The identity attributes may include attributes that can identify the individual associated with the record and may include attributes such as first name and last name, for example. Other attributes may be considered for the Levenshtein distance.

After computing the Levenshtein distances between the query 103 and each of the selected records, the distance engine 140 may further narrow the selected records to those that are below a Levenshtein distance threshold. Similar to the Euclidean distance threshold, the Levenshtein distance threshold may specify a fixed number of records (i.e., the top five records), or may be based on the total number of records in the first dataset 106 and/or second dataset 107. The records with Levenshtein distances that are below the distance threshold may be provided in response to the query 103 and may be used with the record corresponding to the query 103 to create the integrated dataset 180.

In some embodiments, before providing the records, the selected records may be even further reduced or filtered using one or more rules 155 by the rules engine 150. A rule 155, as defined herein, may specify some combination of Levenshtein distances computed for each attribute and Euclidian distances that must exist for the record to be selected as a match. Each rule 155 may further specify a particular attribute as being free when it should not be considered by the rule. Those selected records that do not match at least one rule 155 may be discarded by the rules engine 150. The remaining records may then be provided by the rules engine 150 in response to the query 103.

Continuing to FIG. 3 is illustrated a plurality of rules 155 (e.g., the rules 155A, 155B, 155C, and 155D) that may be used to narrow the matching records. As shown, each rule 155 specifies either a minimum Levenshtein distance for a plurality of attributes or specifies that the attribute is FREE, indicating that the attribute is not considered by the rule 155. Finally, each rule 155 optionally includes a minimum Euclidean distance that is required. Note that while only five attributes are shown (i.e., "First Name", "Last Name", "Birthdate", "Gender", and "Address") it is for illustrative purposes only; more or fewer attributes may be considered by each rule 155.

In the example shown, the rule 155A specifies a minimum Euclidean distance of less than or equal to 1.4, specifies a minimum Levenshtein distance of 2 for the attribute "First Name", specifies a minimum Levenshtein distance of 2 for the attribute "Last name", is FREE for the attribute "Birthdate", specifies a minimum Levenshtein distance of 0 for the attribute "Gender", and specifies a minimum Levenshtein distance of 6 for the attribute "Address." The rule 155B specifies a minimum Euclidean distance of less than or equal to 1.4, specifies a minimum Levenshtein distance of 2 for the attribute "First Name", specifies a minimum Levenshtein distance of 2 for the attribute "Last name", is FREE for the attribute "Birthdate", is FREE for the attribute "Gender", and specifies a minimum Levenshtein distance of 6 for the attribute "Address." The rule 155C specifies a minimum Euclidean distance of less than or equal to 1.4, specifies a minimum Levenshtein distance of 2 for the attribute "First Name", is FREE for the attribute "Last name", specifies a minimum Levenshtein distance of 2 for the attribute "Birthdate", specifies a minimum Levenshtein distance of 0 for the attribute "Gender", and specifies a minimum Levenshtein distance of 6 for the attribute "Address." Finally, the rule 155D specifies a minimum Euclidean distance of less than or equal to 1.4, specifies a minimum Levenshtein distance of 2 for the attribute "First Name", is FREE for the attribute "Last name", specifies a minimum Levenshtein distance of 2 for the attribute "Birthdate", is FREE for the attribute "Gender", and specifies a minimum Levenshtein distance of 6 for the attribute "Address."

Retuning to FIG. 1, after the rules engine 150 applies the rules 155 to the selected records, the rules engine 150 may provide the records that matched at least one rule 155 in response to the query 103. The integration system 110 may then add the record corresponding to the query 103 along with the matching records into the integrated dataset 180. In some embodiments, the integration system 110 may add the records to the dataset 180 by combining them into a single record and adding the combined record to the integrated dataset 180. Alternatively, the integration system 110 may add some or all of the records to the integrated dataset 180 and may link them to the same individual or entity.

As may be appreciated, in some embodiments, there may be millions of records in each of the first dataset 106 and the second dataset 107, which may make processing all the of records as described above extremely computationally expensive.

Accordingly, to reduce the number of records that are considered, before matching records from the first dataset 106 and second dataset 106, the integration engine 1110 may use what is referred to herein as "strategic iterations" to reduce the total number or size of the records that are considered for each iteration.

As one example, the datasets may be first filtered into one or more groups or smaller datasets based on certain attributes such as zip-code and/or first letter of first name. The records may then be matched as described above using each zip-code and first letter of first name group.

Once the matching records have been determined for each of these zip-code groups, the integration engine 110 may remove all of the matched records from the first dataset 106 and second dataset 107 and may further remove all attributes related to addresses. This will capture records for individuals who may have moved at some point (i.e., do not share the same zip-codes) and, at the same time, reduce the overall sizes of the first dataset 106 and second dataset 107.

Other methods for reducing the sizes of the first dataset 106 and the second dataset 107 may include Principal Component Analysis, Product Quantization, and Polysemous Codes, for example.

Figure 4:
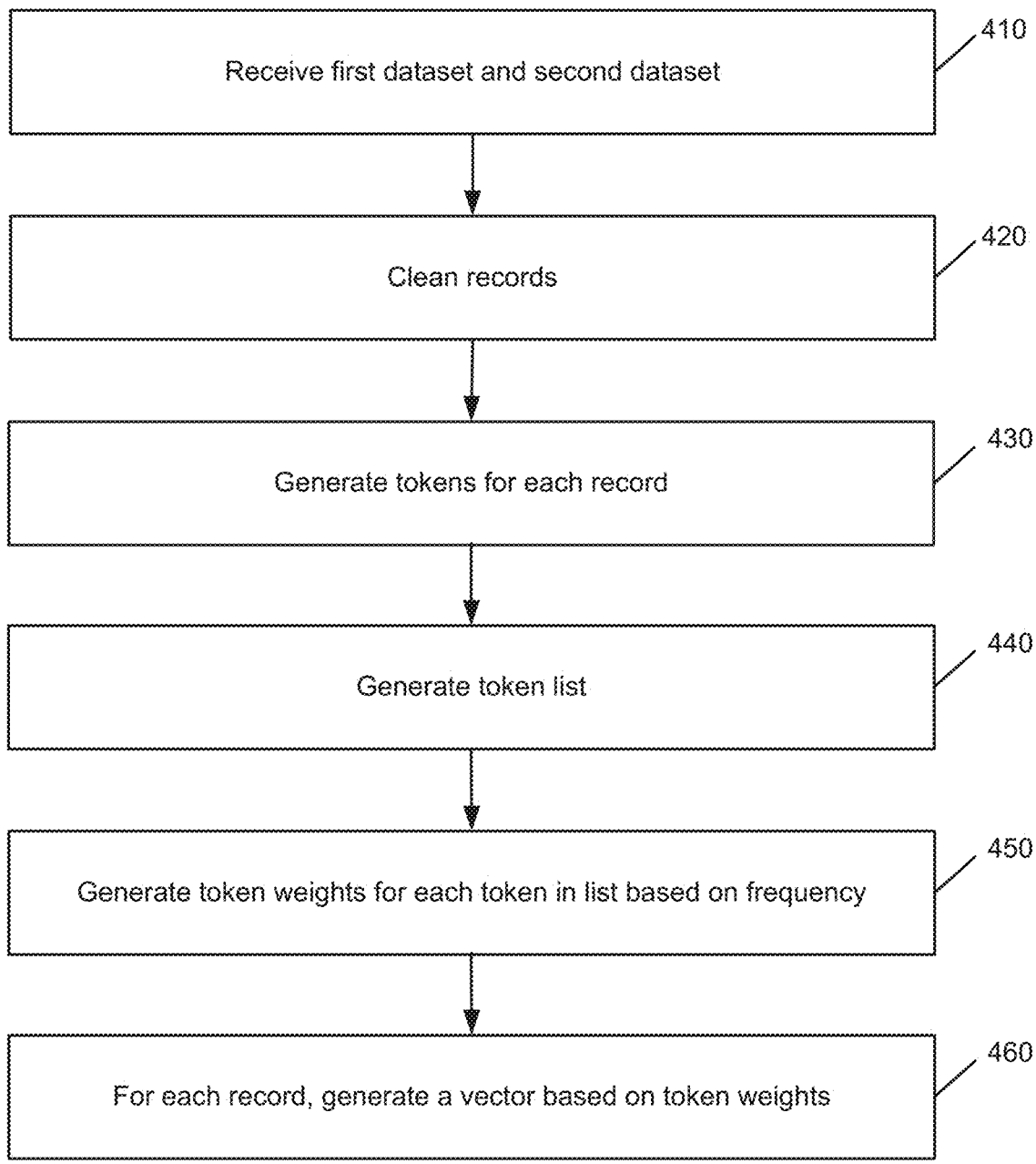
FIG. 4 is an illustration of a method for generating token weights for records from a first dataset and second dataset.

FIG. 4 is an illustration of a method 400 for generating token weights for records from a first dataset and second dataset. The method 400 may be implemented by the integration system 110. The method 400 may be an example of a pre-processing phase that is performed before the datasets are integrated.

At 410, a first dataset and a second dataset are received. The first dataset 106 and the second dataset 107 may be received by the integration system 110. Each dataset may include a plurality of records and each record may include a plurality of attributes. Generally, each record may be associated with an individual. In order to integrate the first dataset 106 and the second dataset 107, the integration system 110 may further determine which records from the first dataset 106 and the second dataset 107 likely refer to the same individual.

At 420, the records are cleaned. The records may be cleaned by the cleaning engine 120. In some embodiments, the records may be cleaned by removing any non-alphanumeric characters from the attributes of each record. Any method for cleaning attributes may be used.

At 430, tokens are generated for each record. The tokens may be generated by the token engine 130 from each of the attributes of each record of both the first dataset 106 and the second dataset 107. Depending on the embodiment, each token may represent a word from the attributes of the datasets. Any method for parsing attributes or strings to generate tokens may be used.

At 440, a a token list is generated. The token list may be generated by the token engine 130. The token list may include each token that is found in an attribute from each record of both the first dataset 106 and the second dataset 107. The token list may be non-deduplicated so that any token that appears in multiple attributes and/or multiple records will appear multiple times in the token list.

At 450, tokens weights are generated. The token weights 135 may be generated by the token engine 130 using the the token list. The token weight 135 for a token may be inversely proportional to the number of times the token appears in the token list.

At 460, for each record, a vector is generated based on the token weights. The vector 137 may be generated by the token engine 130. The vector 137 for a record may include an entry for each token along with a count of the number of times that the particular token appears in any attribute of the record. The count for each token in the vector 137 may be further multiplied by the token weight 135 determined for the token.

Figure 5:
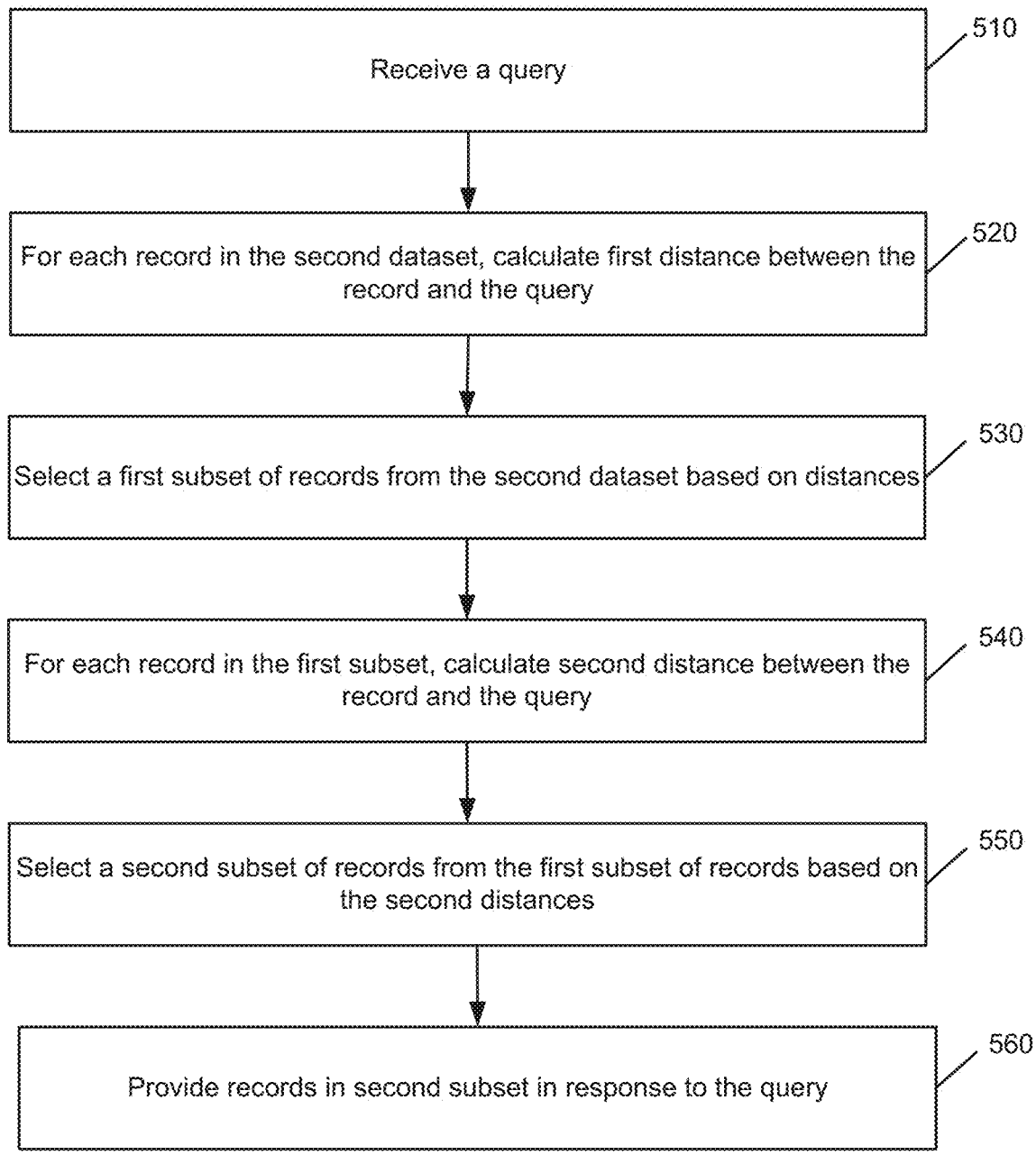
FIG. 5 is an illustration of a method for providing records in response to a query.

FIG. 5 is an illustration of a method 500 for providing records in response to a query. The method 500 may be implemented by the integration system 110.

At 510, a query is received. The query 103 may be a record from the first dataset 106. As part of generating the integrated dataset 180, the integration system 110 may first determine the records from the second dataset 107 that correspond to the same individuals as one or more records from the first dataset 106. The integration system 110 may select a next record in the first dataset 106 as the query 103.

At 520, for each record in the second dataset, a first distance between the record and the query is calculated. The first distance may be calculated by the distance engine 140. The first distance between the query 103 and each record may be calculated by retrieving the vector 137 associated with the query 103 and the vector 137 associated with the record and calculating the first distance using the vectors 137. The first distance between the query and the record may be a Euclidean distance. Other distance formulas may be used.

At 530, a first subset of records from the second dataset is selected based on the computed first distances. The first subset of records may be selected based on the first distances by the distance engine 140. Depending on the embodiment, the distance engine 140 may select all records whose first distances are below a distance threshold or may select some predetermined number of records having the lowest first distances.

At 540, for each record in the first subset, a second distance between the record and the query is calculated. The second distances may be calculated by the distance engine 140. The second distance between each record in the first subset and the query 103 may be calculated based on the attributes of the query 103 and the attributes of the record. The second distance may be a Levenshtein distance. Depending on the embodiment, the Levenshtein distance may be calculated on a per-attribute basis, or across all attributes in the query 103 and record.

At 550, a second subset of records from the first subset of records is selected based on the second distances. The second subset of records may be selected by the distance engine 140. In some embodiments, the distance engine 140 may select the records having the lowest calculated second distances (e.g., Levenshtein distance), or may select all records having calculated distances that are below a threshold.

At 560, the records in the second subset are provided in response to the query. The records may be provided by the integration system 110. The selected records may be used by the integration system, along with the query 103, to create the integrated dataset 180. After providing the selected records, the method 500 may return to 510 where a new record for the first dataset 106 may be received as a new query 103.

Figure 6:
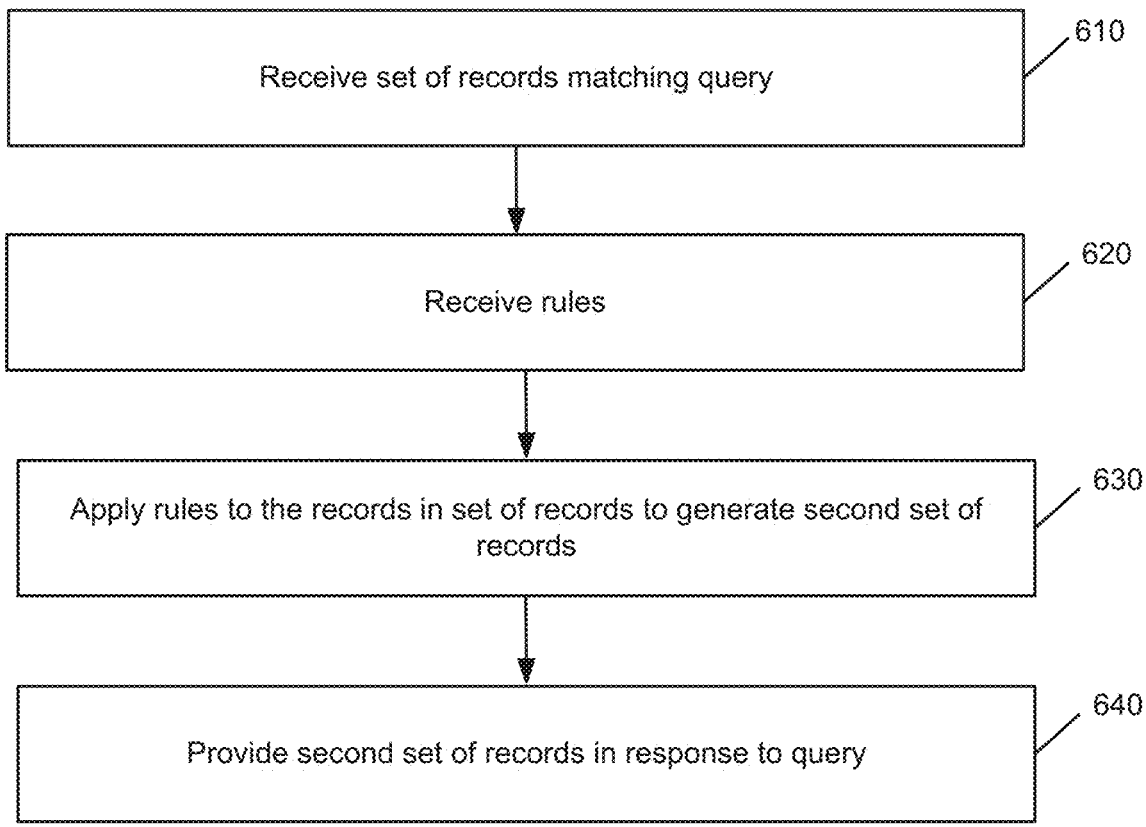
FIG. 6 is an illustration of a method for filtering selected records using one or more rules and for providing the filtered records in response to a query.

FIG. 6 is an illustration of a method 600 for filtering selected records using one or more rules, and for providing the filtered records in response to a query. The method 600 may be implemented by the integration system 110.

At 610, a set of records matching a query is received. The set of records may be received by the rules engine 150 of the integration system 110. The set of records may be those records from the second dataset 107 that satisfied both the first distance threshold (e.g., Euclidean distance) and the second distance threshold (e.g., Levenshtein distance).

At 620, rules are received. The rules 155 may be received by the rules engine 150. Each rule 155 may include a minimum Levenshtein distance for each attribute, or an indication that the particular attribute is not considered by the rule (e.g., FREE). Each rule 155 may further include a minimum Euclidean distance. The rules 155 may be created by a user or administrator based on characteristics of the first dataset 106 and the second dataset 107.

At 630, the rules are applied to the records in the first set of records. The rules 155 may be applied by the rules engine 150. Any record that matches a rule 155 may be placed in a second set of records. Any method for applying rules to records may be used.

At 640, the second set of records is provided in response to the query. The second set of records may be provided by the rules engine 150. The second set of records may be used by the integration system 110, along with the query 103, to create the integrated dataset 180.

Figure 7:
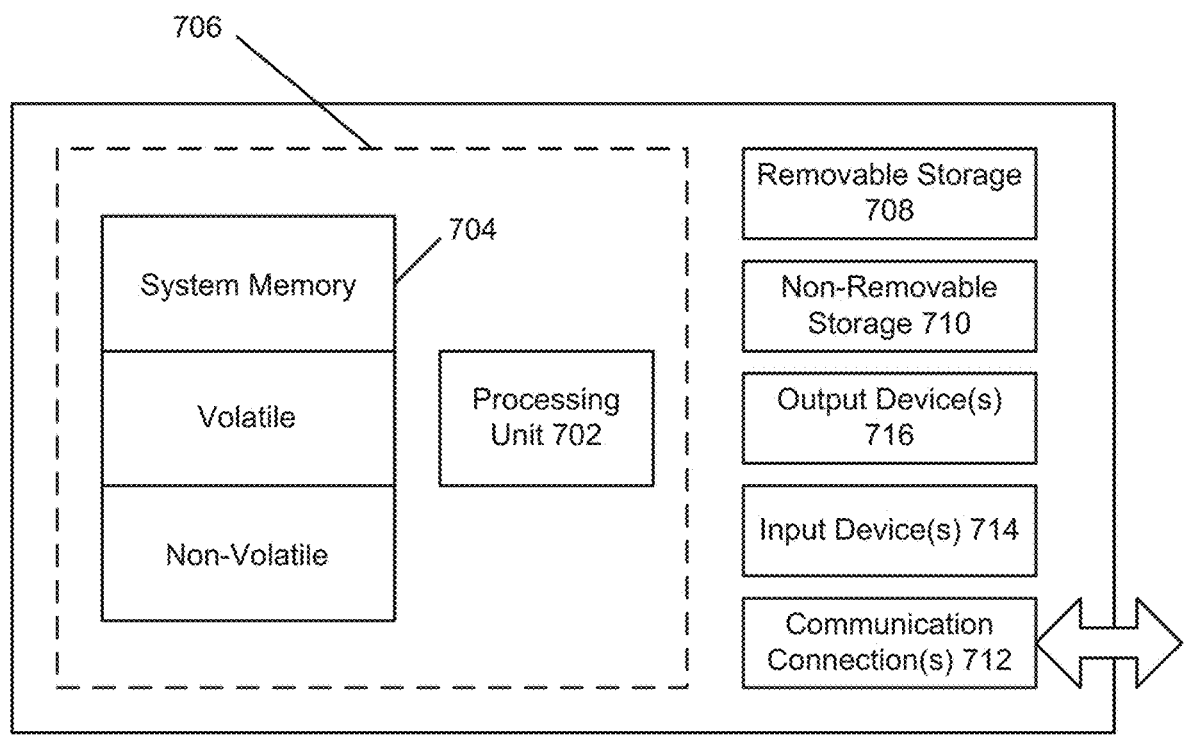
FIG. 7 shows an exemplary computing environment in which example embodiments and aspects may be implemented.

FIG. 7 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by the device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communication connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, by one or more processors, a first dataset, wherein the first dataset comprises a first plurality of records and each record of the first plurality of records comprises a plurality of attributes;
   receiving, by the one or more processors, a second dataset, wherein the second dataset comprises a second plurality of records and each record of the second plurality of records comprises a plurality of attributes, wherein the first plurality of records and the second plurality of records each include at least one record for a same individual of a plurality of individuals;

determining, by the one or more processors, that a first record of the first dataset and a second record of the second dataset are associated with the same individual by:
- selecting, by the one or more processors, the first record, including a first plurality of attributes of the first record, from the first plurality of records of the first dataset to use as a query;
- for each record of the second plurality of records, calculating, by the one or more processors, a first distance between the record of the second plurality of records and the query;
- selecting, by the one or more processors, a first subset of records from the second plurality of records based on the calculated first distance for each record of the second plurality of records;
- for each record in the first subset of records, calculating, by the one or more processors, a second distance based on the first plurality of attributes of the first record selected to use as the query and the plurality of attributes of the record; and
- selecting, by the one or more processors, a second subset of records including the second record from the first subset of records based on the calculated second distance for each record of the first subset of records;

combining, by the one or more processors, the second subset of records with the selected first record from the first plurality of records to form a single combined record;

adding, by the one or more processors, the single combined record to an integrated dataset; and providing, by the one or more processors, the integrated dataset, wherein the integrated dataset includes only one record for each individual of the plurality of individuals.

2. The method of claim 1, further comprising:
generating a list of tokens based on the one or more attributes of the first plurality of records and the one or more attributes of the second plurality of records;
generating a token weight for each token in the list of tokens; and
for each record in the first and the second plurality of records, generating a vector, wherein the vector for a record comprises a count of each token of the list of tokens that appears in the record multiplied by the token weight for the token.

3. The method of claim 2, wherein calculating the first distance between the record of the second plurality of records and the query comprises calculating the first distance between the record of the second plurality of records and the query based on the vector corresponding the query and vector corresponding to the record by the one or more processors.

4. The method of claim 2, wherein the token weight for a token is based on an inverse of a frequency of the tokens in the list of tokens.

5. The method of claim 1, wherein the first distance is a Euclidean distance and the second distance is a Levenshtein distance.

6. The method of claim 1, further comprising selecting the query from the first dataset.

7. The method of claim 1, further comprising:
receiving a plurality of rules, wherein each rule identifies at least two attributes, comprises a minimum first distance, and further comprises a different second distance for each of the at least two attributes;

applying the plurality of rules to the records in the second subset of records to generate a third subset of records, wherein each record in the third subset of records matches at least one rule of the plurality of rules; and
providing the records in the third subset of records in response to the query.

8. The method of claim 1, further comprising removing non-alphanumeric characters from the one or more attributes of the first plurality of records and the second plurality of records.

9. The method of claim 1, wherein the query is associated with an individual, and further comprising determining that the records in the second subset of records are also associated with the individual.

10. The method of claim 1, wherein the first dataset is social determinants of health data and the second dataset is healthcare claim data.

11. A system comprising:
one or more processors; and
a memory storing computer-executable instructions that when executed by the one or more processors cause the one or more processors to:
receive a first dataset, wherein the first dataset comprises a first plurality of records and each record of the first plurality of records comprises a plurality of attributes;
receive a second dataset, wherein the second dataset comprises a second plurality of records and each record of the second plurality of records comprises a plurality of attributes wherein the first plurality of records and the second plurality of records each include at least one record for a same individual of a plurality of individuals;
determine that a first record of the first dataset and a second record of the second dataset are associated with the same individual by:
select the first record, including a first plurality of attributes of the first record, from the first plurality of records of the first dataset to use as a query;
for each record of the second plurality of records, calculate a first distance between the record of the second plurality of records and the query;
select a first subset of records from the second plurality of records based on the calculated first distance for each record of the second plurality of records;
for each record in the first subset of records, calculate a second distance based on the first plurality of attributes of the first record selected to use as the query and the plurality of attributes of the record; and
select a second subset of records including the second record from the first subset of records based on the calculated second distance for each record of the first subset of records;
combine the records in the second subset of records with the selected first record from the first plurality of records to form a single combined record;
add the single combined record to an integrated dataset; and
provide the integrated dataset, wherein the integrated dataset includes only one record for each individual of the plurality of individuals.

12. The system of claim 11, further comprising computer-executable instructions that when executed by the one or more processors cause the one or more processors to:
generate a list of tokens based on the one or more attributes of the first plurality of records and the one or more attributes of the second plurality of records;

generate a token weight for each token in the list of tokens; and for each record in the first and the second plurality of records, generate a vector, wherein the vector for a record comprises a count of each token of the list of tokens that appears in the record multiplied by the token weight for the token.

13. The system of claim 12, wherein calculating the first distance between the record of the second plurality of records and the query comprises calculating the first distance between the record of the second plurality of records and the query based on the vector corresponding the query and vector corresponding to the record.

14. The system of claim 12, wherein the token weight for a token is based on an inverse of a frequency of the tokens in the list of tokens.

15. The system of claim 11, wherein the first distance is a Euclidean distance.

16. The system of claim 11, wherein the second distance is a Levenshtein distance.

17. The system of claim 11, further comprising computer-executable instructions that when executed by the one or more processors cause the one or more processors to:

receive a plurality of rules, wherein each rule of the plurality of rules comprises a minimum second distance and a minimum first distance for each record in the second subset records with respect to the query;

apply the plurality of rules to the records in the second subset of records to generate a third subset of records, wherein each record in the third subset of records matches at least one rule of the plurality of rules; and provide the records in the third subset of records in response to the query.

18. The system of claim 11, further comprising computer-executable instructions that when executed by the one or more processors cause the one or more processors to remove non-alphanumeric characters from the one or more attributes of the first plurality of records and the second plurality of records.

19. A non-transitory computer-readable medium storing computer-executable instructions that when executed by one or more processors cause the one or more processors to:

receive a first dataset, wherein the first dataset comprises a first plurality of records and each record of the first plurality of records comprises a plurality of attributes;

receive a second dataset, wherein the second dataset comprises a second plurality of records and each record of the second plurality of records comprises a plurality of attributes wherein the first plurality of records and the second plurality of records each include at least one record associated for a same individual of a plurality of individuals;

determine that a first record of the first dataset and a second record of the second dataset are associated with the same individual by:

select the first record, including a first plurality of attributes of the first record, from the first plurality of records of the first dataset to use as a query;

for each record of the second plurality of records, calculate a first distance between the record of the second plurality of records and the query;

select a first subset of records from the second plurality of records based on the calculated first distance for each record of the second plurality of records;

for each record in the first subset of records, calculate a second distance based on the first plurality of attributes of the first record selected to use as the query and the plurality of attributes of the record; and select a second subset of records including the second record from the first subset of records based on the calculated second distance for each record of the first subset of records; and provide the records in the second subset of records in response to the query;

combine the records in the second subset of records with the selected first record from the first plurality of records to form a single combined record;

add the single combined record to an integrated dataset; and provide the integrated dataset, wherein the integrated dataset includes only one record for each individual of the plurality of individuals.

20. The computer-readable medium of claim 19, wherein the first distance is a Euclidean distance and the second distance is a Levenshtein distance.

* * * * *